(12) United States Patent  (10) Patent No.: US 8,098,186 B2
Beeri  (45) Date of Patent: Jan. 17, 2012

(54) THROUGH-THE-OBSTACLE RADAR SYSTEM AND METHOD OF OPERATION

(75) Inventor: Amir Beeri, Zoran (IL)

(73) Assignee: Camero-Tech Ltd., Kfar Neter (IL)

( * ) Notice: Subject to any disclaimer, the term of this patent is extended or adjusted under 35 U.S.C. 154(b) by 424 days.

(21) Appl. No.: 12/272,220

(22) Filed: Nov. 17, 2008

(65) Prior Publication Data

US 2009/0135045 A1   May 28, 2009

(30) Foreign Application Priority Data

Nov. 28, 2007 (IL) .......................................... 187708

(51) Int. Cl.
*G01S 13/88* (2006.01)
*G01S 13/89* (2006.01)
(52) U.S. Cl. .............................. 342/22; 342/27; 342/179
(58) Field of Classification Search ...................... 342/22, 342/17, 179
See application file for complete search history.

(56) References Cited

U.S. PATENT DOCUMENTS

| | | | | |
|---|---|---|---|---|
| 4,896,116 A * | 1/1990 | Nagashima et al. | ........... | 324/329 |
| 5,227,799 A * | 7/1993 | Kimura et al. | .................. | 342/22 |
| 5,337,053 A * | 8/1994 | Dwyer | ............................ | 342/90 |
| 5,446,461 A * | 8/1995 | Frazier | ............................ | 342/22 |
| 6,222,481 B1 | 4/2001 | Abrahamson et al. | | |
| 6,466,155 B2 | 10/2002 | Taylor et al. | | |
| 7,167,124 B2 * | 1/2007 | Annan et al. | ..................... | 342/22 |
| 7,304,603 B2 * | 12/2007 | Reed et al. | ..................... | 342/188 |
| 7,382,312 B2 * | 6/2008 | Hintz | ............................... | 342/90 |
| 7,479,918 B2 * | 1/2009 | Johnson et al. | .................. | 342/22 |
| 7,675,655 B2 * | 3/2010 | Marshall et al. | ............... | 358/486 |
| 7,800,527 B2 * | 9/2010 | Douglass et al. | ................ | 342/22 |
| 7,907,081 B2 * | 3/2011 | Noyman | .......................... | 342/22 |
| 7,920,088 B2 * | 4/2011 | Thompson et al. | ............. | 342/90 |

(Continued)

FOREIGN PATENT DOCUMENTS

WO   WO 2007/047419 A2   4/2007

(Continued)

OTHER PUBLICATIONS

Hunt et al.; "Through-the-Wall Surveillance Technologies;" *Corrections Today*; Jul. 2001; vol. 63, No. 4.

(Continued)

*Primary Examiner* — John Sotomayor
(74) *Attorney, Agent, or Firm* — Oliff & Berridge, PLC

(57) ABSTRACT

There are provided a through-the-obstacle radar system and method of operating thereof comprising recording signals and/or derivatives thereof collected during a certain substantial monitoring period, and using the recorded information for generating patterns informative of a monitoring scene. There are further provided a method of motion detection based on through-the-obstacle radar and the system thereof. The method comprises collecting signals and/or derivatives thereof acquired by the radar system during a certain substantial monitoring period and accommodating respective records, said records comprising information characterizing the signals and/or derivatives thereof and information indicative, at least, of the time the signals were obtained; processing the accommodated records and generating at least one histogram characterizing a normative motion level at different time intervals; comparing an actual motion level with the level in the normative histogram corresponding to the same time intervals; and recording the motion as detected if its actual level fits a certain relationship with the corresponding level in the normative histogram.

23 Claims, 6 Drawing Sheets

U.S. PATENT DOCUMENTS

| | | | |
|---|---|---|---|
| 7,956,794 B2 * | 6/2011 | Skultety-Betz et al. | 342/22 |
| 7,973,697 B2 * | 7/2011 | Reilly et al. | 342/22 |
| 7,982,656 B2 * | 7/2011 | Coward et al. | 342/22 |
| 7,999,722 B2 * | 8/2011 | Beeri et al. | 342/22 |
| 2001/0035837 A1 | 11/2001 | Fullerton et al. | |
| 2002/0140597 A1 * | 10/2002 | Taylor et al. | 342/28 |
| 2003/0164790 A1 | 9/2003 | Kurita et al. | |
| 2004/0178942 A1 | 9/2004 | McLemore | |
| 2005/0128124 A1 * | 6/2005 | Greneker et al. | 342/22 |
| 2005/0264438 A1 | 12/2005 | Fullerton et al. | |
| 2006/0061504 A1 | 3/2006 | Leach, Jr. et al. | |
| 2006/0087471 A1 * | 4/2006 | Hintz | 342/22 |
| 2007/0057761 A1 | 3/2007 | Johnson | |
| 2007/0176821 A1 * | 8/2007 | Flom et al. | 342/25 A |
| 2009/0033548 A1 * | 2/2009 | Boxman et al. | 342/179 |
| 2009/0284405 A1 * | 11/2009 | Salmon et al. | 342/22 |
| 2011/0063157 A1 * | 3/2011 | Jordan et al. | 342/22 |

FOREIGN PATENT DOCUMENTS

WO    WO 2007113824 A2 * 10/2007

OTHER PUBLICATIONS

Hunt; *Through the Wall Imaging Radar*; Mar. 2003; AKELA, Incorporated.

"Smart through-wall radar fives new tactical advantages to police, special forces and emergency services;" Nov. 14, 2006; http:www.cambridgeconsultants.com/news_pr179.html; Accessed May 11, 2008.

"Through-the-Wall Surveillance (TWS);" Aug. 20, 2007; http:www.Ottawa.drdc-rddc.gc.ca/html/TEO-RS-216-tws_e.html; Accessed May 11, 2008.

Gauthier et al.; *Surveillance Through Concrete Walls*; Dec. 2003; Defence R&D Canada-Ottawa.

* cited by examiner

THROUGH-THE-OBSTACLE RADAR SYSTEM AND METHOD OF OPERATION

CROSS REFERENCE TO RELATED APPLICATIONS

This application claims the benefit of Israeli patent application No. 187708 filed on Nov. 28, 2007, which is hereby incorporated by reference herein.

FIELD OF THE INVENTION

This invention relates to through-the-obstacle radar systems and, more particularly, to implementation of through-the-obstacle radar systems for Intelligence, Surveillance, and Reconnaissance (ISR) applications.

BACKGROUND OF THE INVENTION

Through-the-obstacle radar systems enable gathering information through obstacles such as walls, doors, ground, smoke, vegetation and other visually obstructing substances and, as such, may be invaluable for Intelligence, Surveillance, and Reconnaissance (ISR) applications, including military, counter-terrorism forces and law enforcement applications.

The problem of effective implementation of through-the-obstacle radar systems for ISR applications has been recognized in prior art and various systems have been developed to provide a solution, for example:

U.S. Pat. No. 6,222,481 (Brusmark et al.) entitled "Method of detecting and classifying objects by means of radar" discloses a method comprising transmitting a broadband radar signal comprising wavelengths that coincide with characteristic lengths of targets to be detected and classified, and receiving a returned echo signal and analyzing the signal in a combined time-frequency domain. The invention comprises determining characteristic frequencies in the signal return and their mutual time relations. A comparison with the corresponding stored values of an analysis of possible targets is performed.

U.S. patent application No. 2001/035,837 (Fulerton et al.) entitled "Time transfer utilizing ultra wideband signals" discloses a system and method for selective intrusion detection using a sparse array of time modulated ultra wideband (TM-UWB) radars. Two or more TM-UWB radars are arranged in a sparse array around the perimeter of a building. Each TM-UWB radar transmits ultra wideband pulses that illuminate the building and the surrounding area. Signal return data is processed to determine, among other things, whether an alarm condition has been triggered. High resolution radar images are formed that give an accurate picture of the inside of the building and the surrounding area. This image is used to detect motion in a highly selective manner and to track moving objects within the building and the surrounding area. Motion can be distinguished based on criteria appropriate to the environment in which the intrusion detection system operates.

U.S. patent application 2003/164,790 (Tsubota et al.) entitled "Detecting system" discloses a position detecting system used to monitor a suspicious person and to give an alarm by using a radar which transmits/receives a microwave or a millimeter wave. As the shape of a detectable area of the radar and that of the area to be monitored are not always equal to each other, an alarm may be erroneously given in response to the object outside the area to be monitored. The area to be monitored is surrounded by a plurality of reflectors, and the coordinate values of the reflectors and the detecting object are calculated based on the signals reflected from the reflectors and the detecting object, and are then compared.

U.S. patent application No. 2004/178,942 (McLemore) entitled "Apparatus and method for rapid detection of objects with time domain impulsive signals" discloses a method and system for detecting objects of interest in a target area using ultra wide band (UWB) RF signals. A transmitter and antenna array generate ultra wide band RF impulsive signals that are used to probe a target area that may include an object of interest. An antenna and a signal processor receive return signals from the target area and process the return signal to generate a set of coordinates. The coordinates of the processed return signals are compared to coordinates of known objects in a pre-existing database to determine whether there is a match between the return signal and a known object. When there is an indication of a match, the existence of the known object is displayed to an operator of the system.

U.S. patent application No. 2005/264,438 (Fulerton et al.) entitled "System and method for spatially diverse radar signal processing" discloses an ultra wideband radar system for detecting moving objects. The system comprises an antenna, which may be scanned in at least one dimension, and a signal processor wherein the signal processor includes a scan combiner that combines scan information in accordance with a candidate trajectory for the moving object. Scans may be combined by integration or filtering. A fast calculation method is described wherein the scans are combined into subsets and subsets are shifted in accordance with the candidate trajectory before further combination.

U.S. patent application 2006/061,504 (Leach et al.) entitled "Through wall detection and tracking system" discloses a system for detecting and tracking an individual or animal, and comprises producing a first return radar signal from the individual or animal with a first low power ultra wideband radar; producing a second return radar signal from the individual or animal with a second low power ultra wideband radar; maintaining the first low power micro-power radar a fixed distance from the second low power ultra wideband radar; and processing the first return radar signal and the second return radar signal in detecting and tracking of the individual or animal.

U.S. patent application 2007/057,761 (Johnson) entitled "Motion detector" discloses various embodiments of a motion-monitoring system comprising at least one antenna fixed within a barrier, the at least one antenna transmitting at least one first radio-frequency signal through the barrier to at least one volume outside the barrier, the at least one first radio-frequency signal reflecting from at least one object in the at least one volume to produce a plurality of second radio-frequency signals, which are received by the at least one antenna, at least one sensing circuit sensing the plurality of second radio-frequency signals and generating a plurality of time-domain output signals, and at least one processor receiving the plurality of time-domain output signals and comparing at least one successive time-domain output signal to at least one previous time-domain output signal to estimate at least one characteristic of the at least one object, including a motion of the at least one object.

International Application No. WO07/047,419 (Zemany) entitled "Motion detection system using CW radar in combination with additional sensors" discloses use of additional one or more sensors with the CW radar to confirm the motion detection result.

SUMMARY OF THE INVENTION

Typically, through-the-obstacle radar systems are used in ISR applications for motion detection, target location/tracking and scene imaging. These applications are based on real time or near real time processing of acquired data.

In accordance with certain aspects of the present invention, there is provided a through-the-obstacle radar system configured to record signals and/or derivatives thereof collected during a certain substantial monitoring period, and to use the recorded information for generating patterns informative of a monitoring scene.

The through-the-obstacle radar system comprises:
a) a recording unit operatively coupled to a processor and configured to accommodate records of one or more acquired signals and/or derivatives thereof collected during a certain substantial monitoring period, said records comprising information characterizing the signals and/or derivatives thereof and information indicative, at least, of the time the signals were obtained;
b) a processor configured to receive records accommodated in the recording unit during a certain period of monitoring, and to generate patterns informative of a monitoring scene during the monitoring period;
c) a storing unit operatively coupled to the processor and configured to accommodate one or more patterns generated by the processor and/or received from one or more external sources.

In accordance with further aspects of the invention, the patterns may be generated in different forms, e.g. in the form of a histogram characterizing the level of motion at certain time intervals within the monitoring period, in the form of a two-dimensional top-view activities map, etc. The generated patterns may be related, for example, to normative and/or actual behavior patterns, normative and/or actual activities patterns, normative and/or actual scene layout related patterns, etc.

In accordance with further aspects of the present invention, the generated patterns and/or derivatives thereof may be implemented in a radar imaging system as perceiving image ingredients to be displayed together with an image.

In accordance with other aspects of the present invention, there is provided a method of operating a through-the-obstacle radar system, the method comprising:
a) collecting signals and/or derivatives thereof acquired by the radar system during a certain substantial monitoring period and accommodating respective records, said records comprising information characterizing the signals and/or derivatives thereof and information indicative, at least, of the time the signals were obtained;
b) processing to accommodated records and generating patterns informative of a monitoring scene during the monitoring period.

In accordance with further aspects of the present invention, the processing may further comprise (and, accordingly, the processor may be further configured) analyzing information characterizing a monitoring period X and to generate one or more patterns characterizing a period Y, the period Y being a part of the period X. The processing may further comprise comparing the generated pattern with a normative pattern and causing a response to be activated when the comparing patterns have a predetermined relationship, and/or detecting an unusual pattern without a priori knowledge of the normative pattern, and/or calculating probability of motion in a certain area and generating a layout of a building and interior in accordance with said calculated probability.

In accordance with other aspects of the present invention, there is provided a motion detection system based on through-the-obstacle radar, the system comprising:
a) a recording unit operatively coupled to a processor and configured to accommodate records of one or more acquired by the radar signals and/or derivatives thereof collected during a certain substantial monitoring period, said records comprising information characterizing the signals and/or derivatives thereof and information indicative, at least, of the time the signals were obtained;
b) the processor configured to receive records accommodated in the recording unit during a certain period of monitoring, to generate at least one histogram characterizing normative motion level at different time intervals, to compare an actual motion level with the level in the normative histogram corresponding to the same time intervals, and to record the motion as detected if its actual level fits a certain relationship with the corresponding level in the normative histogram.

In accordance with other aspects of the present invention, there is provided a method of motion detection based on through-the-obstacle radar, the method comprising:
a) collecting signals and/or derivatives thereof acquired by the radar system during a certain substantial monitoring period and accommodating respective records, said records comprising information characterizing the signals and/or derivatives thereof and information indicative, at least, of the time the signals were obtained;
b) processing the accommodated records and generating at least one histogram characterizing a normative motion level at different time intervals;
c) comparing an actual motion level with the level in the nonnative histogram corresponding to the same time intervals; and
d) recording the motion as detected if its actual level fits a certain relationship with the corresponding level in the normative histogram.

In accordance with farther aspects of the present invention the processing may further include (and the processor may be further configured) generating a notice of an intrusion event if a predefined relationship between the actual and normative motion levels is detected.

Among advantages of certain embodiments of the present invention is facilitating obtaining information on a building/room layout, behavior and activity pattern, etc.; such information provides valuable criteria for ISR applications.

BRIEF DESCRIPTION OF THE DRAWINGS

In order to understand the invention and to see how it may be carried out in practice, certain embodiments will now be described, by way of non-limiting example only, with reference to the accompanying drawings, in which.

DETAILED DESCRIPTION OF EXEMPLARY EMBODIMENTS

Figure 1:
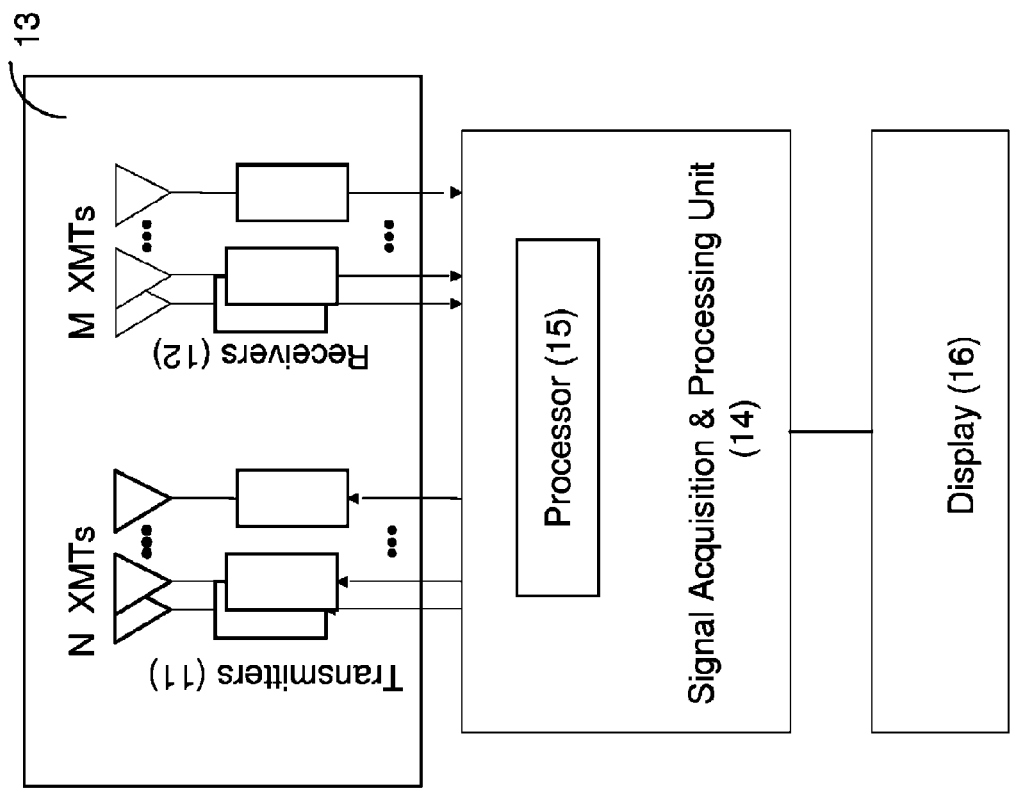
FIG. 1 illustrates a generalized block diagram of a through-the-obstacle radar system as known in the art.

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

In the drawings and description, identical reference numerals indicate those components that are common to different embodiments or configurations.

Unless specifically stated otherwise, as apparent from the following discussions, it is appreciated that throughout the specification discussions utilizing terms such as "processing", "computing", "calculating", "determining", "generating" or the like, refer to the action and/or processes of a computer or computing system, or processor or similar electronic computing device, that manipulate and/or transform data represented as physical, such as electronic, quantities within the computing system's registers and/or memories into other data, similarly represented as physical quantities within the computing system's memories, registers or other such information storage, transmission or display devices.

Embodiments of the present invention may use terms such as, processor, computer, apparatus, system, sub-system, module, unit, device (in single or plural form) for performing the operations herein. This may be specially constructed for the desired purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, Disk-on-Key, smart cards (e.g. SIM, chip cards, etc.), magnetic-optical disks, read-only memories (ROMs), random access memories (RAMs), electrically programmable read-only memories (EPROMs), electrically erasable and programmable read only memories (EE-PROMs), magnetic or optical cards, or any other type of media suitable for storing electronic instructions capable of being conveyed via a computer system bus.

The processes/devices presented herein are not inherently related to any particular electronic component or other apparatus, unless specifically stated otherwise. Various general purpose components may be used in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

The references cited in the background teach many principles of implementation of through-the-obstacle radar systems in ISR applications that are applicable to the present invention. Therefore the full contents of these publications are incorporated by reference herein where appropriate, for appropriate teachings of additional or alternative details, features and/or technical background.

In the drawings and descriptions, identical reference numerals indicate those components that are common to different embodiments or configurations.

Bearing this in mind, attention is drawn to FIG. 1 illustrating a generalized block diagram of a through-the-obstacle radar system as known in the art.

For purpose of illustration only, the following description is made with respect to an imaging system based on a UWB radar. The illustrated imaging system comprises $N \geq 1$ transmitters (11) and $M \geq 1$ receivers (12) (together referred hereinafter as "sensors") arranged in (or coupled to) at least one antenna array (13) referred to hereinafter as a "sensor array". At least one transmitter transmits a pulse signal (or other form of UWB signal, such as, for example, M-sequence coded signal, etc.) to a space to be imaged and at least one receiver captures the scattered/reflected waves. To enable high quality imaging, sampling is provided from several receiving channels. The process is repeated for each transmitter separately or simultaneously with different coding per each transmitter (e.g. M-sequence UWB coding).

The received signals are transferred to a signal acquisition and processing unit (14) coupled to the sensor array (13). The signal acquisition and processing unit is capable of receiving the signals from the sensor array and providing a digitalization thereof. The obtained digitalized data are further processed, said processing depending upon requirements of the radar system application (e.g. motion detection, object localization, 3D imaging, etc.) The calculations necessary for processing the obtained signals are provided by the processor (15) by using different appropriate techniques, some of them known in the art. The obtained signals and/or appropriate data are processed in real time or near real time. The results of the processing are transferred to a display (16) coupled to the signal acquisition and processing unit.

Note that the invention is not bound by the specific UWB radar imaging system described with reference to FIG. 1 or processing technique. Those versed in the art will readily appreciate that the invention is, likewise, applicable to any other through-the-obstacle radar system capable of obtaining physical inputs informative, at least, of a part of a scene of interest concealed by an obstacle, processing the obtained data in accordance with requirements of a certain application, and displaying the results.

Figure 2:
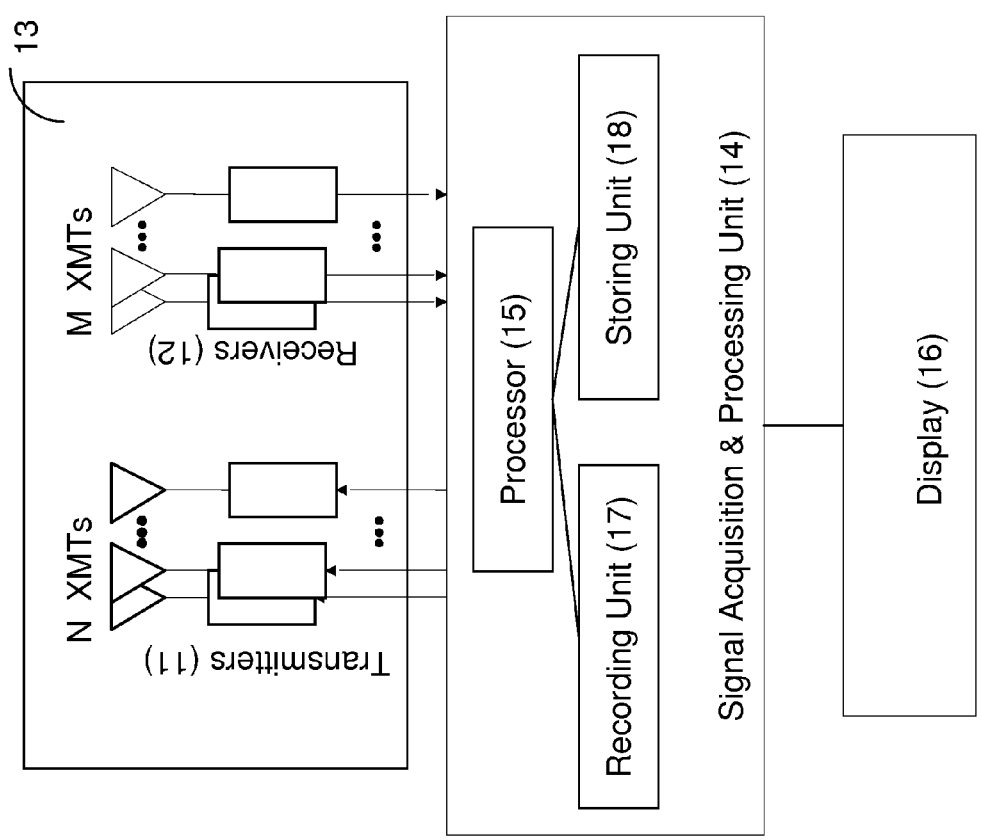
FIG. 2 illustrates a generalized block diagram of a through-the-obstacle radar system in accordance with certain embodiments of the present invention.

FIG. 2 illustrates a generalized block diagram of a through-the-obstacle radar system in accordance with certain embodiments of the invention.

In accordance with certain embodiments of the invention the signal acquisition & processing block comprises a recording unit (17) operatively coupled to the processor (15). The recording unit accommodates records of obtained signals and/or derivatives thereof collected during a certain substantial time period of monitoring (e.g. 1 hour, 1 day, 1 week, etc.). The derivatives may include, for example, analog signals integrated over a certain range of coordinates, time, frequencies, sensors, and/or otherwise; digital form of any of the obtained signals and/or analog derivatives thereof; data resulting from digital integrating the obtained signals in accordance with certain criteria, etc. The operations facilitating the above derivatives may be provided, for example, by the processor (15), by an analog integrator comprised in the signal acquisition & processing block (not shown), by a tracker module (not shown) further detailed with reference to FIG. 5 and/or otherwise. These records of signals and/or data (referred hereinafter as "records") comprise information characterizing the signal or derivatives thereof and information indicative, at least, of the time the signals were obtained (and/or indicative of time period of integration when relevant). The records may further comprise information indicative of respective scene coordinates, monitoring objects (e.g. track records), etc.

The processor (15) is further configured to retrieve records accommodated in the recording unit during certain periods of monitoring and to provide necessary calculations in order to generate patterns informative of the monitoring scene (e.g. behavior patterns, activity patterns, scene layout related patterns, etc.) during a certain monitoring period. The generated patterns are stored in a storing unit (18) operatively coupled to the processor (15). The storing unit may further comprise patterns received from external equipment (e.g. normative activity patterns in accordance with monitoring by a video camera, suspicious activity patterns, scene layout in accordance with available blue-prints, etc.). Optionally, the processor may generate a new pattern by analyzing the records accommodated in the recording unit during a certain period of monitoring together with the patterns stored in the storing unit. Optionally, the processor may analyze records (or respective patterns) characterizing a period X and generate patterns characterizing a period Y, the period Y being a part of the period X (e.g. the processor may generate a normative daily pattern by averaging data obtained during a one-month monitoring period, etc.). The patterns generation will be further detailed with reference to FIGS. 3-5. The generated patterns may be displayed, further used by the radar system in other modes of its operation, be exported to a remote terminal, or be used by some external equipment, etc.

The processor may be further configured to compare the generated pattern with a normative pattern (e.g. certain previously generated pattern(s) or otherwise stored pattern) and to cause a response to be activated when the comparing patterns have a predetermined relationship. The comparing is provided in accordance with certain pre-defined criteria. A response to a detected unusual pattern or to another detected predetermined relationship may include, for example, activation of imaging mode of the radar system, activation of external equipment for collecting additional information, providing alerts and/or alarms, requesting a human response, etc.

Alternatively, the processor may be configured to detect an unusual pattern without a priori knowledge of the normative pattern. In such embodiments, the processor is configured to automatically learn a probabilistic model of normative behavior (e.g. through the use of a Hidden Markov Model) and to use this model to infer the generated pattern.

Those skilled in the art will readily appreciate that the invention is not bound by the configuration of FIG. 2; equivalent and/or modified functionality may be consolidated or divided in another manner and may be implemented in software, firmware, hardware, or any combination thereof.

Figure 3:
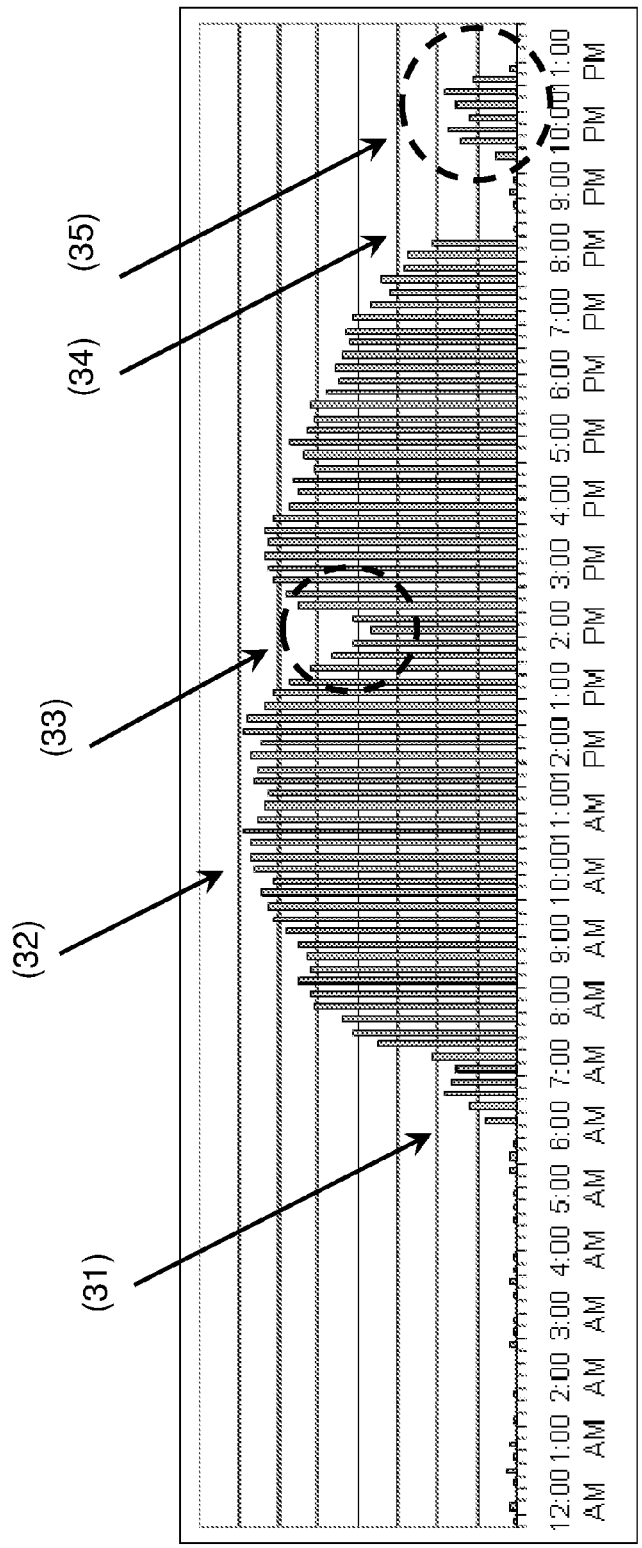
FIGS. 3-5c, illustrate non-limiting examples of patterns generated in accordance with certain embodiments of the present invention.

Referring to FIGS. 3-5, there are illustrated non-limiting examples of patterns generated in accordance with certain embodiments of the present invention.

FIG. 3 illustrates a normative pattern generated in the form of a histogram, characterizing level of motion at a certain time (e.g. in a certain office). The 24 hour pattern is created by averaging data obtained during long-period monitoring (e.g. over one month). In certain embodiments of the invention the values of motion levels corresponding to a certain time of day averaged over the long-period monitoring are stored in the records, while in other embodiments the records may comprise only data characterizing the obtained signals, and the average motion levels may be calculated while generating the pattern. The histogram may be continuously updated during the further monitoring.

The illustrated histogram may provide, for example, the following information:
1. Start of activities (31)—06:30 in the morning;
2. Peak (32) of the morning activity is around 11:00;
3. Noon drop (33) of the activity is around 14:00;
4. End of activities (34) is around 20:30 in the evening;

Accordingly, a motion movement/activity (35) detected at 22:00 with a level substantially higher than the corresponding level in the normative histogram may be regarded as abnormal.

The described normative histogram may be used, for example, in a radar based intrusion detection system in accordance with certain embodiments of the present invention. Such a system is configured to generate and store the activity patterns as detailed above, to register an actual motion level, to compare it with a corresponding motion level in the normative histogram, and to detect an intrusion event, if a pre-defined relationship between the actual and normative motion levels is detected. Likewise, the normative histograms generated in accordance with certain embodiments of the present invention may be used with a non-radar intrusion system, for example for decreasing false detection.

Similarly, in accordance with certain embodiments of the present invention, the above normative histogram may be used in a through-the-obstacle radar-based motion detection system with no pre-defined (or configurable) threshold for motion detection. In such system a motion is recorded as detected if its measured level fits a certain relationship with the corresponding (time-wise) level in the normative histogram (e.g. a measured motion is more than 10% higher than the normative motion at the corresponding time).

Figure 4B:
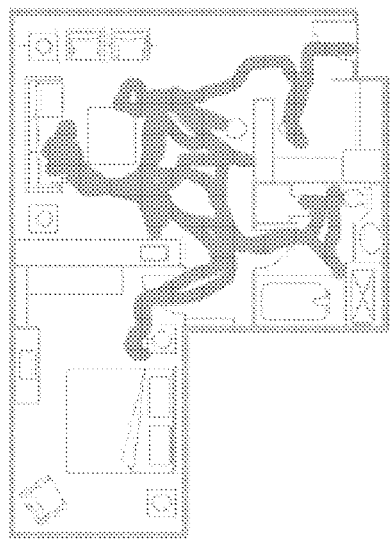
Figure 4D:
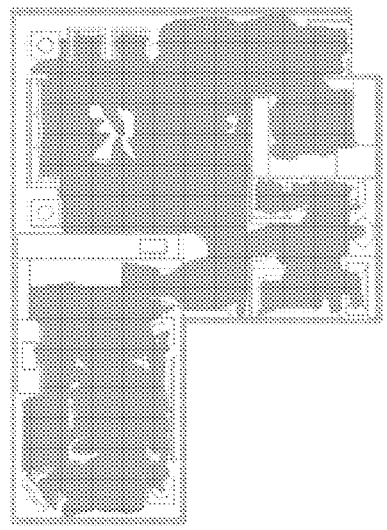
Figure 4A:
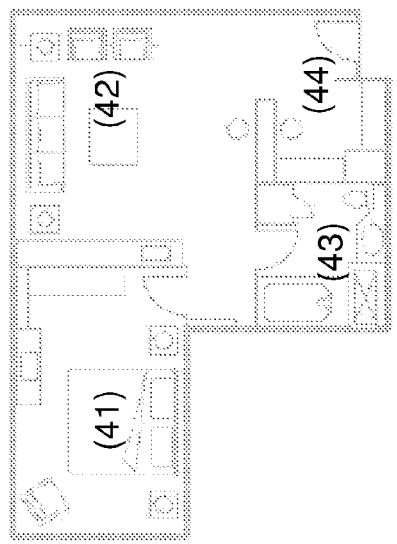
Figure 4C:
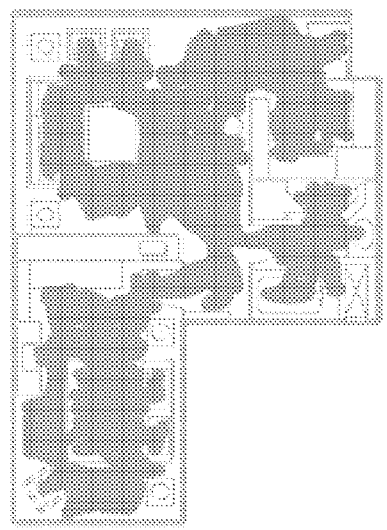

FIGS. 4b-4g illustrate, by way of non-limiting example, patterns resulting from two dimensional (2D) top-view activity monitoring in an apartment illustrated in FIG. 4a. The patterns characterize integrated activities: FIG. 4b illustrates a pattern generated by integrating records obtained during a short period of time; FIG. 4c illustrates a pattern generated by medium-term integration and FIG. 4d illustrates a pattern generated by integration over a long monitoring period.

From the shaded areas in FIGS. 4c and 4d it can be observed that there are four main areas of activity in this house—the bedroom (41), the living room (42), the washroom (43) and the kitchen (44) connected to the entrance area. The patterns allow also finding out more about the walkways between these areas and some places where no movements were detected.

Figure 4E:
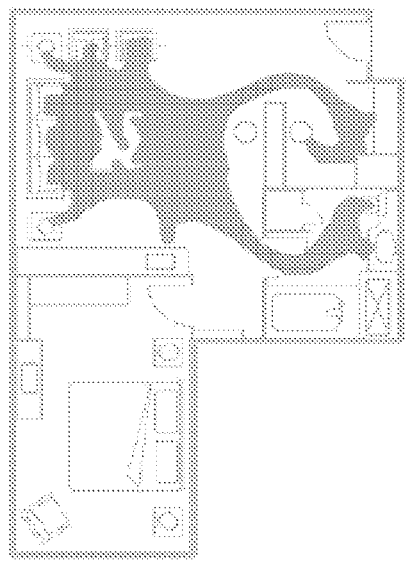
Figure 4G:
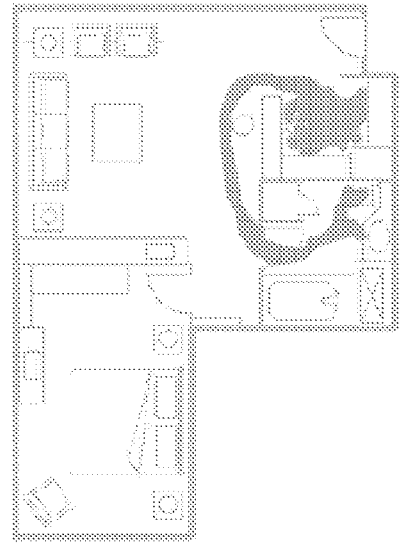
Figure 4F:
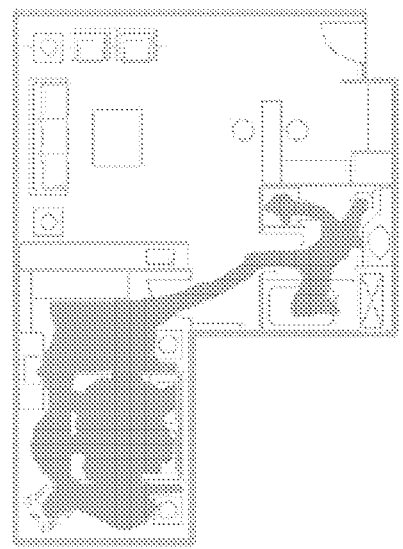

The integration may be provided according to a certain time during a day, a certain day of the week, a certain area in an apartment, etc. For example, FIGS. 4e-4g illustrate a pattern integrated from records obtained at different times during the day: FIG. 4e illustrates a day-time pattern (most activities are in the living room), FIG. 4f illustrates a night-time pattern (most activities are in the bedroom and the bathroom), and FIG. 4g illustrates an evening pattern (most activities are in the kitchen).

Figure 5A:
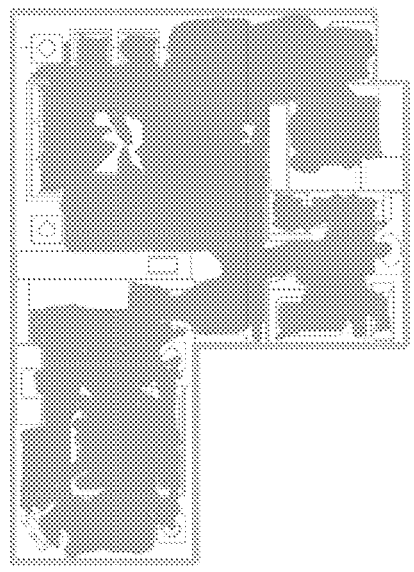
Figure 5C:
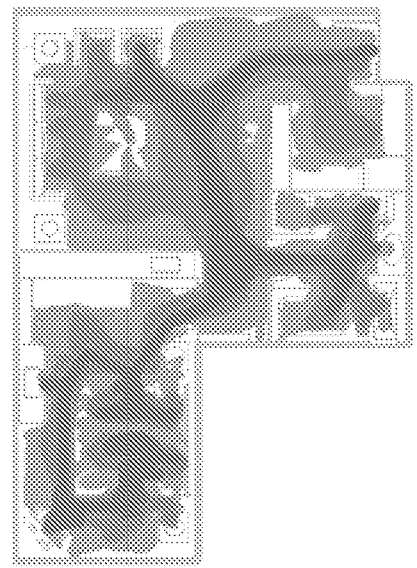
Figure 5B:
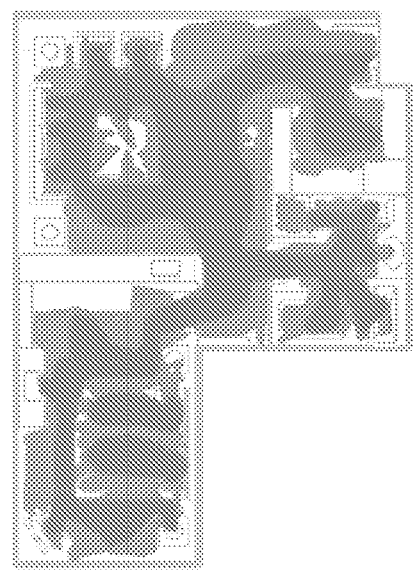

FIGS. 5a-5c illustrate, by way of non-limiting example, the respective patterns illustrated in FIGS. 4b-4d and bearing marks of probability of motion in certain areas (higher intensity of black colour represents higher level of probability).

In certain embodiments of the present invention the processor is further configured to calculate, based on the obtained records, probability of motion in a certain area and to generate a layout of the building and interior. The calculations may be provided based on overall statistics of motions in a certain area, track records (sequence of motions associated with certain objects) and/or otherwise.

The track records may be obtained with the help of the tracker module (not shown in FIG. 2, which may be comprised in the signal acquisition & processing) configured to track movement of different objects (persons) in the mapping building during certain periods of time, and to locate the moving objects with respect to a known reference point. The tracker module is operatively coupled to the recording unit, and the recording unit is configured to accommodate track records received from the tracker module. The processor is configured to retrieve track records from the recording unit and to generate a building layout as a pattern based on the probability of activities in different locations calculated in accordance with track records.

The track records may be further processed to detect and utilize a "shadowing effect". In fact, the "shadow" of moving person(s) paints the objects in the room located behind the moving targets, thus enabling utilization of the "shadowing effect" for mapping location of static objects (walls, furniture, etc.).

As was disclosed in the co-pending application, No. PCT/IL2007/000427 (Beeri et al.) filed Apr. 1, 2007 and assigned to the assignee of the present invention, the operating of a through-the-obstacle radar imaging system may include perceiving processing provided in order to facilitate a meaningful representation and/or an instant understanding of the image to be displayed. In accordance with certain embodiments of the present invention, some of the generated patterns may be implemented as perceiving image ingredients to be displayed together with an image. For example, an overlay of generated layout with real-time imaging results may provide a greater sense of all activities inside a building.

It should be understood that at least part of the system according to the invention, may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

It is also to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception, upon which this disclosure is based, may readily be utilized as a basis for designing other structures, methods, and systems for carrying out the several purposes of the present invention.

Those skilled in the art will readily appreciate that various modifications and changes can be applied to the embodiments of the invention as hereinbefore described without departing from its scope, defined in and by the appended claims.

The invention claimed is:

1. A through-the-obstacle radar system comprising:
   a) a recording unit operatively coupled to a processor and configured to accommodate records of one or more acquired signals and/or derivatives of the signals collected during a certain substantial monitoring period X, the records comprising information characterizing the signals and/or the derivatives of the signals and information indicative, at least, of the time the signals were obtained; and
   b) a processor configured to receive records accommodated in the recording unit during a certain period of monitoring, and to generate one or more patterns informative of a monitoring scene during the substantial monitoring period,
   wherein at least one generated pattern is informative of a level of motion characterizing the substantial monitoring period.

2. The system of claim 1 wherein the processor is further configured to analyze information characterizing the substantial monitoring period X and to generate one or more patterns characterizing a period Y, the period Y being a part of the period X.

3. The system of claim 1 wherein the processor is further configured to compare the generated pattern with a normative pattern, and to cause a response to be activated when the comparing patterns have a predetermined relationship.

4. The system of claim 1 wherein the processor is further configured to detect an unusual pattern without a priori knowledge of a normative pattern.

5. The system of claim 1 wherein the processor is further configured to generate at least one of a layout of a building or a layout of an interior with the help of the generated pattern informative of the level of the motion characterizing the substantial monitoring period.

6. The system of claim 1 wherein at least one of the generated patterns is generated in the form of a histogram characterizing the level of the motion at certain repeating time intervals within the monitoring period.

7. The system of claim 6 wherein repeating time intervals within the monitoring period are selected from a group comprising: days of the week, time of the day, months of the year and combinations thereof.

8. The system of claim 7 wherein the processor is further configured to notice an intrusion event if a predefined relationship between the actual motion levels and the normative motion levels is detected.

9. The system of claim 6 wherein
   the generated histogram characterizes a normative motion level at different repeating time intervals; and
   the processor is further configured to compare an actual motion level corresponding to certain repeating time intervals with motion level in the normative histogram corresponding to the same repeating time intervals.

10. The method of claim 9 wherein the processing further comprises generating a notice of an intrusion event if a predefined relationship between the actual motion levels and the normative motion levels is detected.

11. The system of claim 1 wherein at least one of the generated patterns is generated in the form of a two-dimensional top-view activities map.

12. The system of claim 1 wherein at least one of the generated patterns is selected from a group comprising: normative and/or actual behavior patterns, normative and/or actual activities patterns, normative and/or actual scene layout related patterns.

13. The system of claim 1 wherein at least one of the generated patterns and/or derivatives of the patterns is implemented in a radar imaging system as perceiving image ingredients to be displayed together with an image.

14. A method of operating a through-the-obstacle radar system, the method comprising:
   a) collecting signals and/or derivatives thereof acquired by the radar system during a certain substantial monitoring period X and accommodating respective records, the records comprising information characterizing the signals and/or derivatives of the signals and information indicative, at least, of the time the signals were obtained; and
   b) processing to accommodated records and generating one or more patterns informative of a monitoring scene during the substantial monitoring period,
   wherein at least one generated pattern is informative of a level of motion characterizing the substantial monitoring period.

15. The method of claim 14 wherein the processing further comprises analyzing information characterizing a monitoring period X and to generate one or more patterns characterizing a period Y, the period Y being a part of the substantial monitoring period X.

16. The method of claim 14 wherein the processing further comprises comparing the generated pattern with a normative pattern, and causing an activation of a pre-configured response when the compared patterns have a predetermined relationship.

17. The method of claim 14 wherein the processing further comprises detecting an unusual pattern without a priori knowledge of a normative pattern.

18. The method of claim 14 wherein the processing further comprises generating a layout of a building and/or interior with the help of the generated pattern informative of the level of the motion characterizing the substantial monitoring period.

19. The method of claim 14 wherein at least one pattern is generated in a form of a histogram characterizing the level of the motion at certain repeating time intervals within the monitoring period.

20. The method of claim 19 wherein
the generated histogram characterizes a normative motion level at different repeating time intervals, the method further comprising comparing an actual motion level corresponding to certain repeating time intervals with the motion level in the normative histogram corresponding to the same repeating time intervals; and
the repeating time intervals are selected from a group comprising: days of the week, time of the day, months of the year and combination thereof.

21. The method of claim 14 wherein at least one of the generated patterns is generated in the form of a two-dimensional top-view activities map.

22. The method of claim 14 wherein at least one of the generated patterns is selected from a group comprising: normative and/or actual behavior patterns, normative and/or actual activities patterns, normative and/or actual scene layout related patterns.

23. The method of claim 14 wherein at least one of the generated patterns and/or derivatives of the patterns is implemented in a radar imaging system as perceiving image ingredients to be displayed together with an image.

* * * * *

UNITED STATES PATENT AND TRADEMARK OFFICE
CERTIFICATE OF CORRECTION

| | |
|---|---|
| PATENT NO. | : 8,098,186 B2 |
| APPLICATION NO. | : 12/272220 |
| DATED | : January 17, 2012 |
| INVENTOR(S) | : Amir Beeri |

It is certified that error appears in the above-identified patent and that said Letters Patent is hereby corrected as shown below:

IN THE CLAIMS:

Column 10, Claim 10, Line 29, should read:

10. The ~~method~~ system of claim 9 wherein the processing further comprises generating a notice of an intrusion event if a predefined relationship between the actual motion levels and the normative motion levels is detected.

Signed and Sealed this
Seventeenth Day of April, 2012

David J. Kappos
*Director of the United States Patent and Trademark Office*